United States Patent

Randich

[15] 3,688,621

[45] Sept. 5, 1972

[54] APPARATUS FOR CROP SHEARING WITH THE USE OF FLYING SHEARS

[72] Inventor: Erasmus A. Randich, Pittsburgh, Pa.

[73] Assignee: Allegheny Ludlum Industries, Inc., Pittsburgh, Pa.

[22] Filed: March 31, 1971

[21] Appl. No.: 129,825

[52] U.S. Cl. ..........................83/80, 83/106, 83/157, 83/165, 83/288, 83/370
[51] Int. Cl. ..............................................B26d 7/06
[58] Field of Search..........83/80, 106, 157, 165, 288, 83/370

[56] References Cited

UNITED STATES PATENTS

| | | | |
|---|---|---|---|
| 1,533,263 | 4/1925 | Pritchard | 83/157 |
| 2,120,313 | 6/1938 | Smitmans | 83/288 X |
| 2,351,962 | 6/1944 | Harrison | 83/157 |
| 2,414,772 | 1/1947 | Sheperdson | 83/106 |

*Primary Examiner*—Frank T. Yost
*Attorney*—Vincent G. Gioia and Robert F. Dropkin

[57] ABSTRACT

Apparatus for making a front or tail crop on moving bar stock with the use of flying shears, and for disposing of the cropped portion accurately in a crop chute without encountering problems which sometimes occur with prior art systems when the cut bar fails to enter a guide tube at the exit side of the shears. This is accomplished by providing a retractable or pivotal guide tube which can be moved quickly from a position where it causes a crop to be deflected into a crop chute to a position where it will immediately receive the end of a sheared bar and convey it away from the shears. Means are incorporated into one embodiment of the invention for deflecting a cut length of bar material out of the normal path of travel of cut lengths in order that it can be checked for tolerances and metallurgical analysis.

9 Claims, 4 Drawing Figures

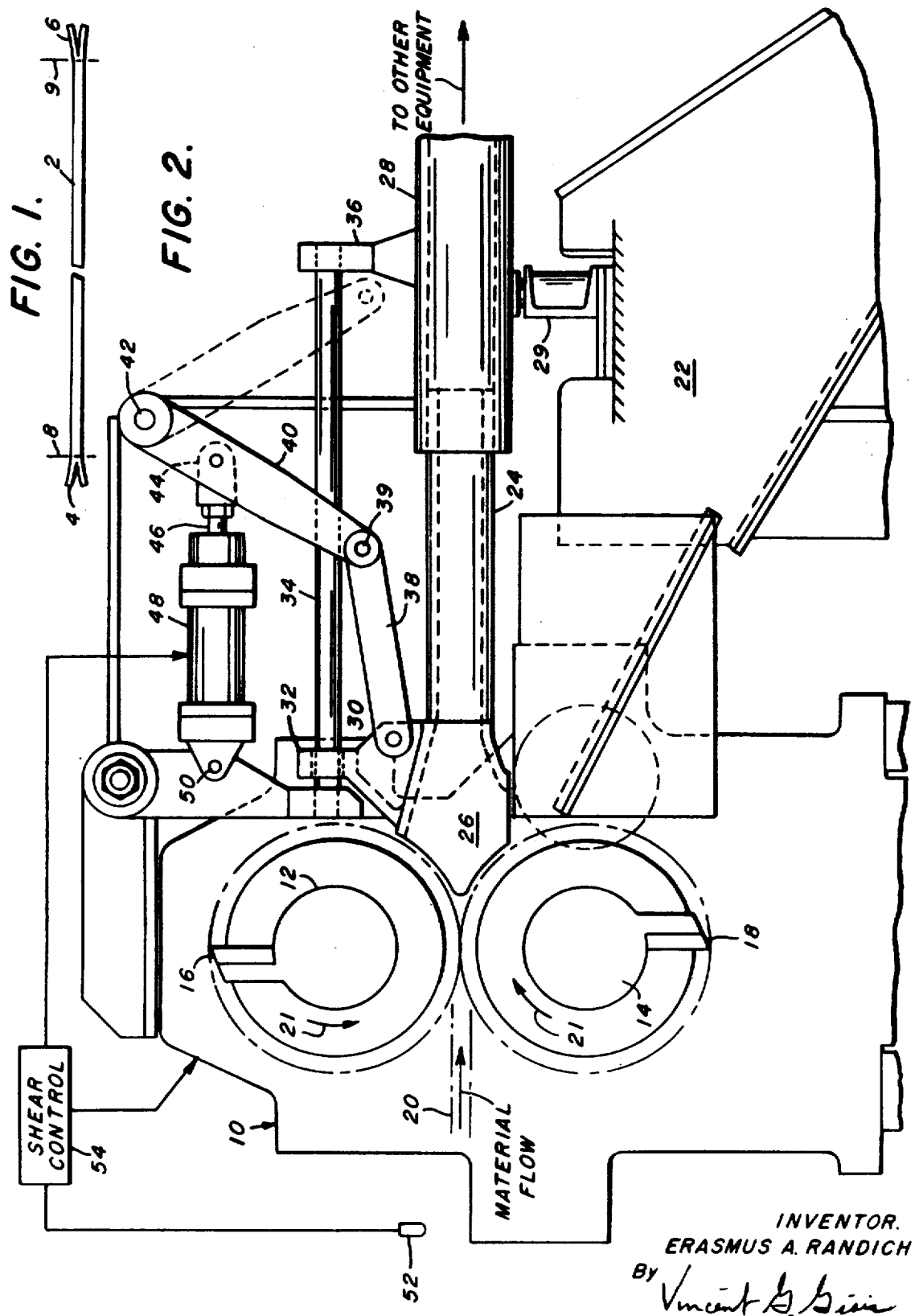

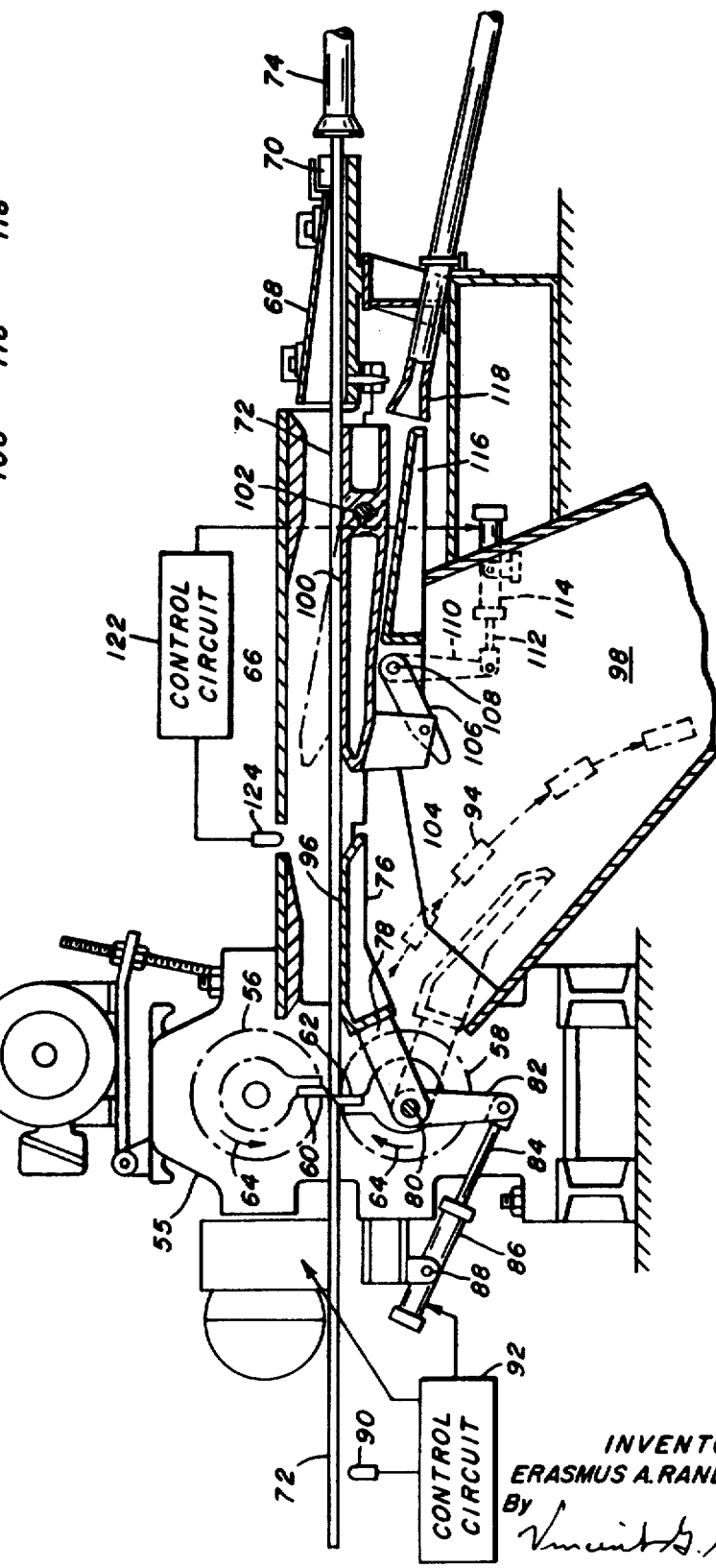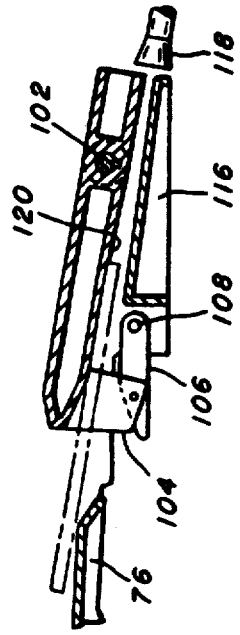

APPARATUS FOR CROP SHEARING WITH THE USE OF FLYING SHEARS

BACKGROUND OF THE INVENTION

In the manufacture of metallic rods or bars, a starting billet is passed through a succession of billet mills where its cross section is progressively reduced until the final workpiece, which is coiled, has a length usually exceeding 1000 feet and a diameter typically of 1 inch or less. The workpiece, after passing through the mills which produce the final reduction, is directed through tubular guideways and guide boxes which guide it from one mill to the next and direct the leading end of the workpiece into the roll passes of succeeding mills.

In passing through the mills, the leading and trailing ends of the workpiece become split or frayed, somewhat analogous to the frayed end of a rope; and if these split ends are not cut off or cropped, they cannot be fed through the guideways between mills nor, indeed, be threaded into the entrance side of a mill.

Ordinarily, the forward and trailing ends of the workpiece are cropped between two succeeding mills with the use of a flying shear which comprises a pair of shearing blades mounted on rotary members above and below the workpiece to be cut. When it is desired to shear or crop an end of the workpiece, the rotary members are engaged with a drive mechanism through a clutch and caused to rotate through one revolution. As the rotary members rotate, the shearing blades carried thereby are caused to simultaneously cut into opposite sides of the workpiece to shear the same. The direction of rotation of the shearing blades is such that they move with the bar. Ideally they have circumferential speeds equal to the lineal speed of the bar passing therebetween in order that shearing can be accomplished without stopping the bar.

Shears of this type have been built which are capable of shearing metal rod and bar stock while moving at speeds of up to 7500 feet per minute. The problem of shearing long lengths of bar stock at high speeds to accurate lengths, which is a very difficult one, requires the use of very accurate timing devices and relays, along with sensitive controls and most of all, a design with a minimum of inertia of the rotating parts. There is another problem present, which is the ability to make either a front or tail crop and to direct the cropped portion accurately into a crop chute.

In the past, most flying shears of this type were provided with an exit guide tube having a funnel-shaped opening spaced from the shears by as much as 2 and 3 feet and into which the end of the cropped rod was directed. The reason for spacing the funnel-shaped end of the guide tube from the shears was to permit the split, cropped ends to fall downwardly into a crop chute rather than being pushed forwardly through the guide tube along with the remainder of the workpiece. While shearing, the time lag or the forward pull of the shear blades, due to mismatched speeds, sometimes caused the rod to throw a loop on the delivery side of the shear. Since the rod was not supported for some distance beyond the shear blades in prior art devices, this loop usually caused cobbles to result and very often prevented the cropped end from properly falling into the crop chute. Hence, due to cobbles of this type and improper crop disposal, many productive hours of rolling rods are wasted and in many cases needless accidents have occurred.

The ability to take samples of cut lengths is another problem that has occurred in the past with flying shears of this type, especially in the specialty steel business where it is necessary to analyze the rod to determine its physical and/or metallurgical characteristics.

SUMMARY OF THE INVENTION

In accordance with the present invention, the foregoing and other problems associated with flying shears are eliminated by an arrangement incorporating a guide tube having a funnel or bell-shaped opening immediately adjacent the exit side of flying shears in order that the forward end of a cut length will immediately enter the guide tube and become supported with the result that it cannot throw a loop which might result in a cobble. However, during a front or tail crop, a portion of the guide tube is pivoted downwardly or is moved away from the shears rapidly in order to permit the crop to fall by gravity into a crop chute; whereupon the aforesaid portion of the guide tube is moved back into its original position.

The forward end of a rod or bar to be cropped is sensed by an infrared heat sensor or the like before it enters the flying shears. This initiates the operation of the flying shears and, through appropriate time delay circuitry, positions the guide tube so as to deflect the crop into a chute. Similarly, when the trailing end of the rod or bar passes the heat sensor, the guide tube is again activated through appropriate time delay circuitry to deflect the tail crop into the crop chute.

Further, in accordance with the invention, a portion of the guide tube may be pivoted so as to deflect a cut length to be sampled into a sampling tube, whereupon the section is again pivoted into alignment with the remainder of the guide tube so that the workpiece is passed to further processing equipment, such as a succeeding billet mill.

The above and other objects and features of the invention will become apparent from the following detailed description taken in connection with the accompanying drawings which form a part of this specification, and in which:

FIG. 1 illustrates the manner in which the front and tail ends of a workpiece become frayed or split in passing through successive stands of a billet mill;

FIG. 2 is an elevational view of one embodiment of the invention in which a guide tube is moved away from the exit side of flying shears in order to permit a cropped end to fall into a chute;

FIG. 3 is an elevational view, partly in section, of another embodiment of the invention wherein the guide tube is pivoted in order to deflect a cropped end into a crop chute; and FIG. 4 is a broken-away cross-sectional view of a portion of the device of FIG. 3 showing the manner in which a cut length of bar stock may be deflected into a sampling tube for testing.

With reference now to the drawings, and particularly to FIG. 1, there is shown on an exaggerated scale the frayed or split end effect which results when a workpiece or rod 2 passes through a billet mill. The workpiece, which progressively increases in length from that of the starting billet to in excess of 1000 feet, develops frayed or split ends 4 and 6. As was explained above, the workpiece passes through generally tubular guideways in passing from one mill stand to the other. The frayed ends 4 and 6 would impede its passage through the guide tubes or guideways and guide boxes if, in fact, it can be threaded into a guideway or mill roll pass. Consequently, it becomes necessary to crop or shear the front and trailing ends as at 8 and 9 to remove the split ends.

End cropping is achieved with a flying shear, an example of which is schematically shown in FIG. 2 and identified by the reference numeral 10. It comprises a pair of rotary members 12 and 14 which carry radially-projecting shear blades 16 and 18, respectively. A length of rod or bar material 20 to be cropped passes between rotary members 12 and 14 which can be engaged by a clutch, not shown, and caused to rotate in the direction of arrows 21. When it is desired to shear the rod 20, the clutch simultaneously connects the rotary members 12 and 14 to a drive system such that shears 16 and 18 rotate in the direction of arrows 21 at the same speed and intersect the rod 20 simultaneously, meaning that the shearing edge of blade 16 will be properly aligned with the shearing edge of blade 18. After the material is sheared, the blades 16 and 18 rotate to their positions of rest shown in FIG. 2.

As was explained above, in prior art devices of this type, the end of the rod 20, after passing through the shear 10, would pass into a guideway located several feet beyond the exit side of the shear. The reason for spacing the guideway from the exit side of the shear was to permit cropped ends to fall downwardly into a crop chute, generally designated by the reference numeral 22 in FIG. 2. If the guideway which received the forward end of the cut lengths in prior art devices were immediately adjacent the exit side of the shear, the cropped ends could not fall downwardly into a chute but would either pass along the guideway with the remainder of the desired cut material or jam the guideway. The problem is complicated by the fact that the trajectory of the cropped end cannot be predicted; and, hence, the guideway had to be spaced far enough to accommodate the maximum trajectory.

Due to the fact that the speeds of the shear blades 16 and 18 may not be perfectly synchronized with the lineal speed of the moving bar 20, or because the speeds of succeeding mill stands are not perfectly synchronized, it sometimes happens that a loop or blip is thrown (i.e., a whiplash) in the rod at the exit side of the shear. This blip can also be due to impact of the rod on entry to a succeeding rolling mill, or because of the weight of the rod over a long, unsupported span. This latter condition can cause sagging in the rod, resulting in inaccurate cutting and possible cobbles. This loop, in turn, could cause the end of the rod to miss the guideway spaced from the shear or otherwise result in a cobble (i.e., spewing out of material in a tangled mess) and possible damage to equipment and injury to operating personnel, not to mention the loss of material to be processed. That is, since the preceding mill stand continues to issue an essentially continuous length of material at high speed, failure of the forward end of the material to enter the guide tube will cause it to spew out over the plant floor.

In accordance with the present invention, and in the embodiment of FIG. 2, there is provided a tubular guideway 24 having a forward, flared or funnel-shaped opening 26 immediately adjacent the rotary members 12 and 14. The guideway 24, in turn, is reciprocable within a cylindrical support 28 carried on base 29. Integral with the forward, flared end 26 is an upstanding portion 30 provided with an opening 32 which slides on a bar or shaft 34 extending between the shear 10 and an outer support block 36 carried on the cylindrical member 28. The upstanding portion 30, in turn, is connected to a link 38 pivotally connected at 39 to a crank arm 40 rotatable about axis 42. The crank arm 40 is pivotally connected at 44 to the piston rod 46 of a hydraulic or pneumatic cylinder 48 pivotally carried at 50 on the shear 10.

With this arrangement, and assuming that the cylinder 48 is pressurized to move the piston rod 46 to the right as viewed in FIG. 2, the crank arm 40 will move from the full-line position shown in FIG. 2 to the dotted-line position, thereby pulling the link 38 to the right. In this process, the funnel-shaped opening 26 and the tubular guideway 24 are forced to slide to the right also with the guideway 24 sliding into the cylindrical support member 28. As a result, the funnel-shaped opening 26 is separated from the exit side of the shear through a substantial distance in order that a crop can fall into the chute 22 by gravity.

In the operation of the embodiment of FIG. 2, the forward end of the bar 20, which is usually at an elevated temperature, passes beneath an infrared heat sensor 52; however this could be replaced by a photocell, magnetic switch or any other device for sensing the leading end. The photocell 52, in turn, actuates the cylinder 48 through shear control 54 to actuate shear 10 and cause the crank arm 40 to rotate in a counterclockwise direction, thereby pulling the guideway 24 and funnel-shaped opening 26 to the right. As the forward end of the material passes through the shear 10 and is cropped, the crop will be propelled forwardly and down into the chute 22. Immediately thereafter, the cylinder 48 is pressurized in the opposite sense to force the guideway 24 and funnel-shaped opening 26 to the left and into the position shown in FIG. 2. The forward end of the cropped rod 20 can now pass immediately into the guideway 24 and will have its weight supported and will further be constrained against looping. The forward and reverse motion of the guideway 24 occurs very rapidly, on the order of a fraction of a second or less depending upon the application and the speed of mills involved.

When the trailing end of the workpiece passes the heat sensor 52, the shear control 54 again actuates shear 10 and cylinder 48 to rotate the crank arm 40 in a counterclockwise direction, thereby moving the funnel-shaped opening 26 away from the exit side of the shear to permit the tail crop to fall into the chute 22. Thereafter, the cylinder 48 is pressurized in the opposite sense to return the guideway 24 and funnel-shaped opening 26 to the position shown in FIG. 2.

With reference now to FIG. 3, another embodiment of the invention is shown which again includes a flying shear 55 having a pair of rotary members 56 and 58 which carry shearing blades 60 and 62, respectively. The members 56 and 58 rotate in the direction of arrows 64 and are engaged by a clutch or the like, not shown. At the exit side of the shear 55 is an inverted, generally U-shaped housing 66 which communicates, at its end opposite the shear 55 with an entry tube guide 68 having guide rollers 70 through which the workpiece 72 passes before entering a guide tube 74 where it is conveyed to a succeeding mill stand. The bottom of the U-shaped housing 66 is open but is provided with a movable gate 76 connected through arm 78 to a pivot shaft 80. The arm 78, in turn, is connected to crank arm 82 pivotally connected at is lower end to the piston rod 84 of pneumatic cylinder 86. Cylinder 86 is pivotally connected to the shear 55 at 88.

Positioned beyond the entrance end of the shear 55 is a heat sensor 90 or the like which senses the leading end of the workpiece 72 entering the shear 55. When the leading end is thus sensed, the sensor 90 actuates the shear 55 and the cylinder 86 through control circuit 92 to pivot crank arm 82, arm 78 and gate 76 in a clockwise direction and into the dotted-line positions shown. In these positions, the front crop, such as crop 94, will fall downwardly by gravity along the upper surface 96 of the gate 76 and into a crop chute 98. Immediately after the crop falls downwardly, the cylinder 86 is pressurized in the opposite direction by control circuit 92 to move the gate 76 in a counterclockwise direction from the dotted-line position into the full-line position shown where the workpiece can pass over the gate and onto the entry tube guide 68. The operation of the gate 76 is thus similar to the guideway 24 of FIG. 2 except that it pivots downwardly; whereas the guide tube 24 of FIG. 2 reciprocates.

Beyond the gate 76 in the path of travel of the workpiece through the U-shaped guide 66 is a guide member 100 pivotal about an axis 102. The guide member 100 is provided with a downwardly-depending projection 104 pivotally connected at its lower end to a linkage 106 pivotal about pivot pin 108 and connected to crank arm 110. The crank arm 110, in turn, is connected to the piston rod 112 of pneumatic cylinder 114. Beneath the guide member 100 is a stationary guide 116, the lower end of which is positioned in front of a sample cut tube 118.

During normal operation of the device, the guide member 100 will be in the position shown in FIG. 3. However, it is possible to pivot its forward end upwardly into the broken-line position shown by pressurizing cylinder 114 to rotate linkage 106 and crank arm 110 in a clockwise direction. The position of the guide member 100 when cylinder 114 is thus pressurized is shown in FIG. 4. In this position, the forward end of a severed length of workpiece will engage the underside 120 of the guide member 100 and be deflected downwardly between the surface 120 and the upper surface of the stationary guide 116 into the sample cut tube 118. Thus, when it is desired to divert a severed piece in order to sample it, a control circuit 122 is activated by a heat sensor 124 or the like which senses the leading edge of the workpiece to be sampled. When the leading edge is thus sensed, the control circuit 122 pressurizes cylinder 114 to rotate guide member 100 in a clockwise direction and into the broken-line position shown where the forward end of the workpiece strikes the undersurface of the guide member 100 and is deflected downwardly and into the sample cut tube 118. Immediately after the trailing end of the sample workpiece passes the heat sensor 124, the control circuit 122 is then activated to pressurize cylinder 114 in the opposite direction whereby the guide member 100 is pivoted in a counterclockwise direction and into the full-line position shown in FIG. 3. The succeeding length of the workpiece then passes into the tube 74 until it is again desired to sample a workpiece.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In combination with a flying shear of the type in which an elongated workpiece is sheared as it moves between moving shearing blades and wherein the leading and trailing ends of the workpiece are cropped and the resulting crops directed into a crop chute; guide tube means immediately adjacent the exit side of said flying shear for supporting and containing a workpiece as it passes from the shear to prevent cobbles therein, at least a portion of the guide tube means being movable away from the exit side of the shear to permit a crop to fall into a crop chute, means for sensing the passage of the forward and trailing ends of the elongated workpiece into said flying shear, and means operable in response to sensing of an end of the elongated workpiece by said sensing means for moving said portion of the guide tube means away from the exit side of the shear to permit a crop to fall into said crop chute.

2. The combination of claim 1 wherein the elongated workpiece is at an elevated temperature and said sensing means comprises a heat sensor.

3. The combination of claim 1 wherein said guide tube means comprises a tubular guideway reciprocable within a cylindrical support such that it can reciprocate toward or away from said flying shears.

4. The combination of claim 3 wherein said tubular guideway is provided with a funnel-shaped opening facing the exit side of said flying shears.

5. The combination of claim 3 wherein the means for moving said portion of the guide tube means comprises fluid cylinder means for moving said tubular guideway within said cylindrical support away from said shear when the leading and trailing ends of an elongated workpiece approach the shear.

6. The combination of claim 1 wherein the guide tube means includes a stationary portion of generally inverted U-shaped cross-sectional configuration, and a movable bottom gate for said guide tube means which is moved away from said stationary portion when an end of the workpiece is cropped to permit the cropped end to fall downwardly and out of the guide tube means.

7. The combination of claim 6 wherein said bottom gate is pivoted about a generally horizontal axis, and means for pivoting said bottom gate downwardly about said axis when an end of said workpiece is cropped.

8. The combination of claim 1 including means in the guide tube means positioned beyond said movable portion of the guide tube means for deflecting out of the guide tube means a cut length of the workpiece to be sampled.

9. The combination of claim 8 wherein said deflecting means includes a guide member pivotal into the path of travel of a workpiece through the guide tube means.

* * * * *